Nov. 10, 1964　　　　　C. C. WEIKAL　　　　　3,156,887
CORROSION TEST PROBE
Filed June 14, 1960　　　　　　　　　　　　　　　　　2 Sheets-Sheet 1

Nov. 10, 1964 C. C. WEIKAL 3,156,887
CORROSION TEST PROBE
Filed June 14, 1960
2 Sheets-Sheet 2
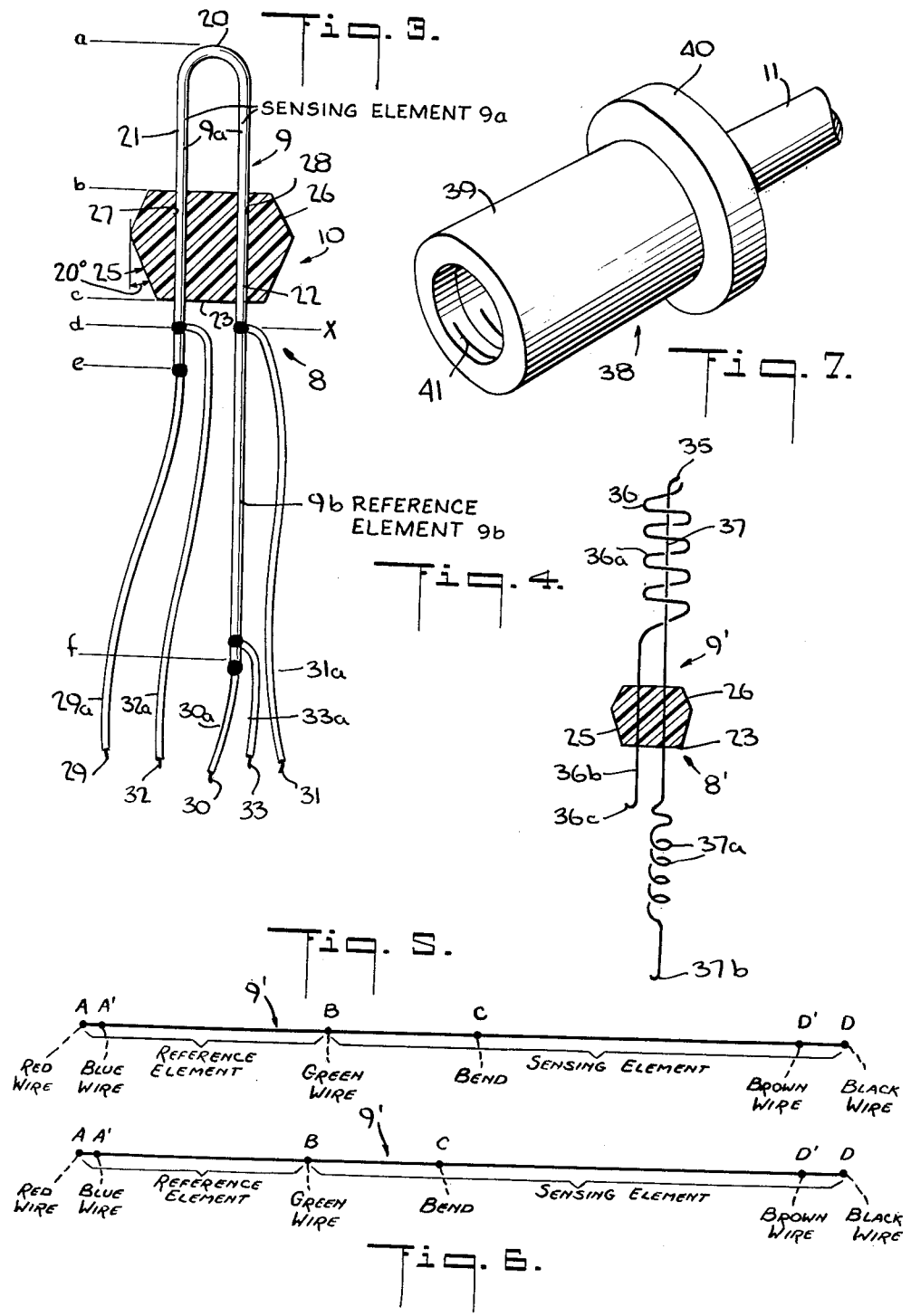

United States Patent Office 3,156,887
Patented Nov. 10, 1964

3,156,887
CORROSION TEST PROBE
Charles Craig Weikel, Corpus Christi, Tex., assignor to Celanese Corporation of America, New York, N.Y., a corporation of Delaware
Filed June 14, 1960, Ser. No. 36,002
4 Claims. (Cl. 338—13)

This invention relates to means for determining the extent of corrosion of parts of apparatus employed in handling corrosive fluids, and in particular to corrosion test probes.

At the present time, it is an almost universal practice to determine the extent of corrosion in industrial operating equipment, especially where such equipment is subjected to the prolonged action of a corrosive medium at elevated temperatures and pressures, by direct observation of the action of the corrosive medium, under actual service conditions, on a specimen or test body introduced into the corrosive environment. There are available on the market, to this end, several different types of corrosion test probes each of which includes an exposed element, generally a piece of metal, to be subjected to the influence of the corrosive environment, and an enclosed element of the same material to serve as a reference member. These elements, are electrically connected into a suitable bridge or like circuit which is adapted to measure the change in the electrical resistance of the exposed element due to its becoming corroded in comparison with the normal resistance thereof in its uncorroded state as represented by the enclosed element.

In the heretofore known test probes of this type the enclosing of the reference element and of the lead wires to isolate them from the corrosive enviroment is usually effected in one or the other of two standard ways. In one case, the reference element is protected by the application thereto of a coat of a suitable corrosion resistant cement or other synthetic coating material, such as polystyrene, polyethylene, ceramics and the like. The reference element is located immediately adjacent to the exposed element. The base of both elements is cast into a ceramic cement or epoxy resin plug which seals off a case section designed to protect the lead wires. Frequently, the coat on the reference element breaks down within a short time under the existing operating conditions and thus renders the test probe useless for further testing. Also frequently, leakage into the case section occurs and exposes the lead wires to the corrosive environment and thereby destroys the usefulness of the probe.

In the other standard procedure for isolating the reference element and the lead wires, both are maintained within the case section with only the exposed element extending through the plug. This is also subject to leakage into the case section due to the fact that presently employed plugs do not effect a permanent and reliable seal.

The active service life of test probes available prior to this invention is limited by the type of seal used to separate the exposed and reference elements or to protect the lead wire soldered joints from contacting the corrosive media. Where metal to ceramic or resin seals are made, difficulties are encountered due in part to the difference of the expansion coefficients of the materials and in part to the physical or chemical breakdown of the sealing material.

Furthermore, particularly where any of these known probes must be employed in apparatus operating at high temperatures and pressures, it has been found that there always arises a problem of back-pressure leakage through the test probe. The elimination of this problem has proved to be a very difficult goal to attain, even through the use of very costly sealing arrangements and expedients. Test probes of the known types, in fact, often cost anywhere from $50 to $250. It will be appreciated that such high replacement costs for the test probes tend to reduce materially the overall economy of the entire operation.

It is, therefore, an important object of the present invention to provide corrosion test probes which are greatly simplified in design and construction as compared to known corrosion test probes and are better adapted for field installation.

It is another object of the present invention to provide greatly improved corrosion test probes which can be produced at much lower manufacturing costs than has heretofore been possible.

Still another object of the present invention is the provision of novel corrosion test probes as aforesaid which are sturdy in construction and completely leakproof while at the same time being very durable and having longer periods of useful life than known test probes.

The hereinbefore indicated major difficulty of overcoming the problem of leakage of the corrosive fluid to the exterior of its container through the test probe itself is eliminated by the present invention through the provision of a specially shaped sealing plug which serves to support the entire testing member, to isolate the sensing element from the reference element as far as the flow of the corrosive fluid is concerned, and to provide a highly effective seal between the interior of the corrosive fluid-containing vessel and the interior of the base or housing of the probe.

In accordance with this invention there is provided a corrosion test probe assembly comprising a casing made up of two hollow members dimensioned so that one fits within the other in a telescoping connection, a plug of resilient material adapted to be subjected to compression in one direction by the telescoping of said hollow members and thereby to expand in dimension transverse to said compression direction to fit snugly against the interior walls of the larger of said hollow members and a corrosion test probe extending through said plug in the direction of said compression.

The characteristics and advantages of the present invention will be more fully understood from the following detailed description thereof when read in conjunction with the accompanying drawings, in which:

FIG. 3 is a partly sectional elevational view of the testing member and sealing plug as assembled but prior to insertion thereof into the housing for the probe with the testing member shown in elevation and the sealing plug shown in section;

FIGURE 4 is a front elevation of the testing member and the sealing plug combination constructed in accordance with another embodiment of the present invention, with the sealing plug shown in axial section and the testing member shown schematically;

FIGS. 5 and 6 are graphic illustrations of the manner of laying out two types of testing members for the probe insert of FIG. 4; and FIG. 7 is a perspective view of a modified type of base which may be employed for the test probes according to the present invention.

Figure 1:
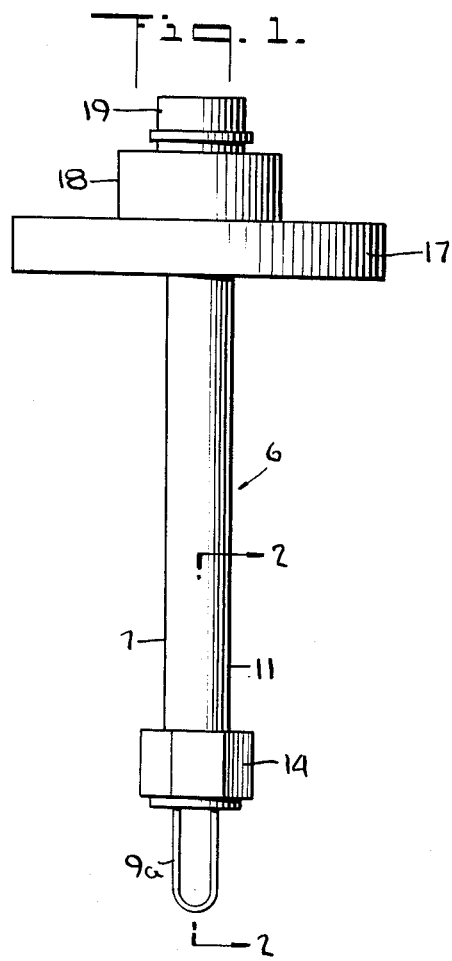
FIG. 1 is an elevational view of a corrosion test probe constructed in accordance with one embodiment of the present invention.
Figure 2:
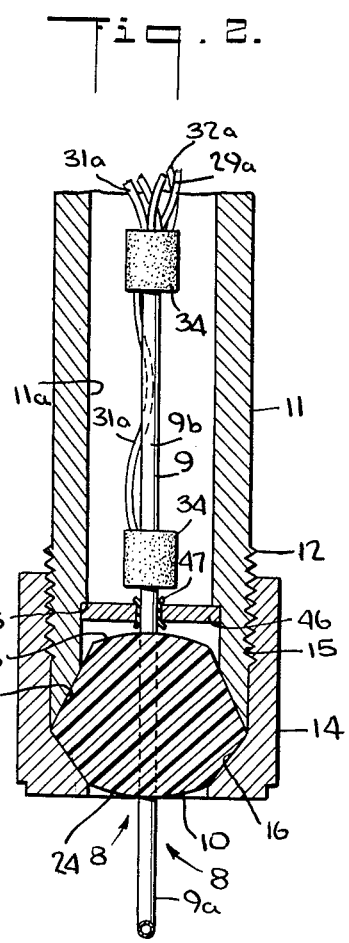
FIG. 2 is a side elevation in section, on an enlarged scale, taken along the line 2—2 in FIG. 1 with the testing member shown in elevation.

Referring now first to FIGS. 1, 2 and 3, it will be seen that the test probe 6 according to one aspect of the invention comprises a probe housing 7, and a probe insert 8 consisting of a testing member 9 and a sealing plug 10, all assembled in a manner to be more fully explained presently. The probe housing 7 comprises a hollow tubular body or pipe 11 made of stainless steel and provided at one end with external threads 12. At the same end, the axial bore or passageway 11a of the pipe 11 is beveled or tapered outwardly at an angle of approximately 20° to the axis of the pipe, as shown at 13. The housing is completed by a stainless steel nut 14 having internal threads 15 at one end, and its bore is tapered approximately 20° toward its axis at the other end, as shown at 16. The other end of the pipe or housing body 11 is welded or otherwise rigidly attached to one face of a welding ring, mounting flange or like base member 17 by means of which it may be affixed to the wall of a vessel or conduit at an opening therein so that the probe 6 may be disposed in the said vessel for the purpose of measuring the corrosion of the latter by the fluid contained therein or passing therethrough. Welded to the opposite face of the flange or base member 17 is a hollow internally threaded adapter element 18 into the bore of which is screwed an electrical connector plug 19 by means of which the probe may be connected to a suitable testing or measuring instrument such as a Wheatstone bridge or the like (not shown). Both the flange and the adapter element are preferably also made of stainless steel.

Referring now specifically to FIG. 3, it will be seen that the testing member 9 of the probe insert 8 consists, for example, of a single length of tubing having an outer diameter of approximately 1/16″ and a wall thickness of about 0.008″. The member 9 may be made of the same material as the apparatus part the corrosion of which is to be tested. Thus, the tubing 9 may be made of stainless or carbon steel, nickel, brass, a variety of alloys, copper, aluminum, etc. The initial overall length of the tubing for stainless steel and metals of similar relatively very high electrical resistance is approximately 8 inches, while for a metal of very low electrical resistance, such as "Admiralty" brass, the length of the tubing must be about 12 inches. At a point 20 approximately one fourth of the distance from one end of the tubing 9, the latter is bent through an angle of about 180° to provide a short quarter-length section 21 extending substantially parallel to the straight remainder 22 of the tubing. Thus, the testing member 9 is seen to be effectively divided into a substantially U-shaped section 9a and a straight section 9b which is merely a continuation of that one of the legs of the U-shaped section to which the portion 21 of the tubing was parallelized. As will be more fully described hereinafter, the section 9a of the testing member 9 serves as the sensing element of the probe, and the section 9b as the reference element thereof.

Figure 2A:
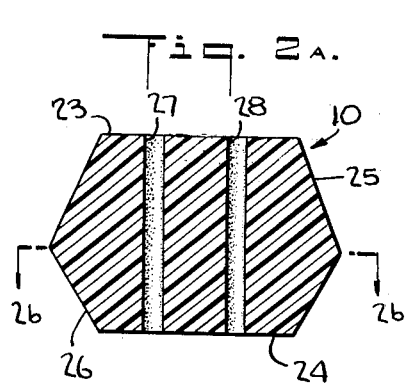
FIGURE 2a is a front elevation in section of the sealing plug 10 as shown in FIG. 2.
Figure 2B:
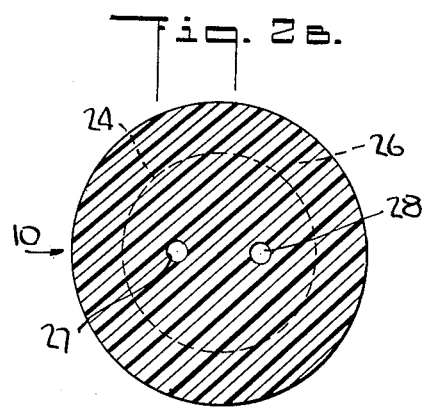
FIG. 2b is a sectional view taken along the line 2b—2b in FIG. 2a but showing the whole diameter of the sealing plug.

The sealing plug 10 which constitutes a part of the probe insert 8 is best shown in FIGS. 2a and 2b and comprises a body of substantially circular cross-section (see FIG. 2b) provided at its opposite ends with plane surfaces 23 and 24 oriented perpendicularly to the axis of the plug. The plug 10 is tapered approximately 20° at each end from a maximum center dimension (see FIG. 2a), thus providing a pair of annular surfaces 25 and 26 oriented angularly relative to the axis of the plug. At two locations on opposite sides of the said axis, the plug 10 is further provided with a pair of substantially parallel bores 27 and 28. In accordance with a preferred aspect of the present invention, the plug 10 is made of polytetrafluoroethylene, a tough, chemically very inert and highly corrosion-resistant synthetic plastic material produced by E. I. du Pont de Nemours and Co. under the trademark "Teflon." This material, in addition to its abovementioned properties, is further possessed of the advantageous characteristics of being able to withstand relatively high pressures and temperatures and of not sticking to surfaces to which it is not bonded. The significance of all these factors will become apparent as the description of the invention proceeds. Other materials which are resilient and heat and corrosion resistant may be used, including polychlorotrifluoroethylene and other fluoro-carbon polymers.

As clearly shown in FIGS. 2 and 3, the legs of the U-shaped section 9a of the testing member 9 extend through the bores 27 and 28, respectively, of the sealing plug 10, relatively short portions of these legs protruding beyond the end surface 23 of the plug, and the bend 29 of the section 9a being spaced a relatively larger distance from the other end surface 24 of the plug. The remaining relatively long section 9b of the testing member 9, the length of which is approximately one half of the original overall length of the tubing 21–22, is located entirely exteriorly of the plug 10 beyond the end surface 23 thereof.

The test probe insert 8 is completed by a plurality of wires or leads 29, 30, 31, 32 and 33 which are covered, respectively, by a plurality of distinctly colored insulating ("Teflon" covered) sleeves 29a, 30a, 31a, 32a and 33a. The colors as such, which may, for example, be black, red, green, brown and blue, respectively, constitute no part of the present invention and actually conform only to a specified color code employed in conjunction with certain measuring instruments to determine to which terminals of the latter the several wires are to be connected. As shown in FIG. 3, the "black" and "red" wires 29 and 30 are connected at one end, respectively, to the free ends of the tubing sections 21 and 22, identified as points or levels e and f, this being accomplished preferably by inserting short, stripped portions of these wires into the bore of the tubing and soldering them securely to the latter. The "green" wire 31 is securely connected at one end, as by soldering, to a median portion of the tubing section 22, identified as point or level X. This point thus defines the junction between the U-shaped section or sensing element 9a and the straight section or reference element 9b of the testing member 9. It will be clear to those skilled in the art, therefore, that the other ends of the wires 29, 30 and 31 are to be connected to those terminals of the measuring instrument, generally a Wheatstone bridge or like circuit (not shown), which enable the sensing element and the reference element 9b to form two of the arms of such a bridge circuit. These three wires thus are the actual measuring wires, the wire 31 being the center tap.

The "brown" wire 32 is securely connected at one end to the leg 21 of the sensing element 9a at a location, identified as point or level d, intermediate point e and the sealing plug end surface 23, identified as point or level c. Similarly, the "blue" wire 33 is securely connected to the reference element 9b at a location intermediate points f and X but in the immediate vicinity of the former. The function of these two wires, when connected to the proper terminals of the measuring instrument, is to compensate for the resistances of the measuring wires 29, 30 and 31.

In assembling the testing probe insert 8 shown in FIG. 3, care must be taken, however, that certain dimensional relationships and ratios are maintained. For example, the exposed length of the sensing element 9a, i.e., the distance a–b, should be at least one third the length of the unexposed reference element 9b (distance X–f) to ensure that the change of resistance of the sensing element due to corrosion will be large enough to be readily detected. The distances c–d and c–X should be at least 1/8″ to ensure that the soldered joints at the points d and X are not broken by the plug 10 when the latter expands under the pressure of the nut 14. Moreover, the length of the reference element 9b, i.e., the distance X–f, must be such that the testing member 9, when the wires 29 to 33 are connected for calibration purposes to the proper terminals of a standard Wheatstone bridge yields a reading in the desired range. Should such an initial reading not be obtained, the soldering point X of the center tap wire 31 must be moved in one direction or the other along the tubing section 22 until Wheatstone bridge reading indicates the desired value.

When the probe insert 8 has been completed, as shown in FIG. 3, but prior to mounting of the insert in the probe housing 7, a plurality of short silicone rubber-covered fiberglass sleeves 34 are slipped over the wires 29 to 33 and ends of the tubing sections 21 and 22. One such sleeve (not shown in the drawings) covers the soldering points for the wires 29 and 32 on the tubing section 21, another sleeve (the lower one shown in FIG. 2) covers the soldering point X for the wire 31 on the tubing section 22, and the third sleeve (the upper one shown in FIG. 2) covers the soldering points for the wires 30 and 33 on the tubing section 22. The last-named of these sleeves 34, as shown in FIG. 2, also surrounds the adjacent portions of the wires 29, 31 and 32, thus forming a bundle of the wires and the tubing. In this manner, any accidental contact, and thus possibility of a short circuit, between the wires and the testing member on the one hand and the metal housing for the probe on the other hand is completely eliminated.

Lead wires 29 to 33 are cut so that approximately one inch extends beyond the end of housing 11 which is attached to member 17. The cut ends are soldered to the leads of the electrical connector plug 19. The plug is rotated counter-clockwise, then pushed into the threaded recess of adapter element 18 and screwed in clockwise until it is secure. The twisting of the lead wires is minimized by this procedure.

In the event that leakage into the probe housing takes place, or in the event that a probe exceeds its normal expected life and cannot be removed until the unit is shut down, electrical connector plug 19 may be removed and severed from its lead wires and a solid stainless steel plug inserted in its stead. This prevents the escape of corrosive material into the atmosphere and constitutes another safety factor in the probe of this invention.

As will be understood from a consideration of FIG. 2, regardless of the ease with which the tubing sections 21 and 22 are initially fitted through the bores 27 and 28 in the sealing plug 10, the latter will be forced tightly against these sections when the nut 14 is screwed onto the pipe or probe housing 11 so as to completely eliminate any possibility of leakage of the corrosive fluid into the interior of the test probe through the said bores. Simultaneously, the mounting of the nut 14 on the pipe 11 will bring the slanted surface 16 thereof against the complementarily slanted surface 26 of the sealing plug 10, as well as the slanted surface 25 of the sealing plug against the complementarily slanted surface 13 of the pipe bore or passageway 11a. As the nut is rotated, of course, the "Teflon" plug will be compressed between the nut and the pipe, and the various corresponding slanted surfaces 16-26 and 13-25 will thus be forced against one another to form absolutely fluid-tight joints inhibiting any leakage around the sealing plug. It is to be noted that, when mounting the nut 14 on the pipe 11, it is merely necessary to rotate the nut until the end surface 24 of the "Teflon" plug 10 is substantially flush with the top surface of the nut. As soon as this condition obtains, the efficacy of the seal will be assured.

In contradistinction to the foregoing, the testing member 9' of the probe insert 8' shown in FIG. 4 is made from a length of solid, relatively thin wire, preferably about 40 mils in diameter. The overall length of the wire 9' will depend on the electrical resistance of the metal of which the wire is made. Merely by way of example, for aluminum and copper wires a length of 40" is required, whereas a length of 20" suffices for a carbon steel wire and a length of 8" for an "Inconel" wire. Basically, the reason for the use of lengths of wire which are much greater than the lengths of the tubing 21-22 employed in accordance with the first-described embodiment of the invention is that wires, if made of the same length as the tubing, would have insufficient electrical resistance for the purposes of the test probe. This, of course, does not apply to the case of "Inconel" or similar alloys having a very high electrical resistance, and as a consequence thereof a testing member 9' made of such an alloy will differ in shape from that shown in FIG. 4 and will more nearly resemble the testing member of FIGS. 1 to 3.

The preparation of a testing member 9' of the type shown in FIG. 4 is illustrated graphically in FIGS. 5 and 6. Referring first to FIG. 5, the initially straight wire in this case is a 40 mil diameter carbon steel wire the length of which (distance A-D) is 20". For a testing member of this type, as for the hereinbefore described tubular member 9, certain dimensional relationships leading to a desired ratio of the lengths of the sensing (exposed) and reference (protected) elements must be maintained, it being noted, however, that the ratio for a solid wire testing member is somewhat different than for the tubular member. These relationships are indicated in FIG. 5 which shows the points A, A', B, D' and D at which the various leads 29 to 33 will ultimately be connected to the member, and also the point C at which the ben in the testing member (point 35 in FIG. 4) will be located. For the wire 9' of FIG. 5, the distance A-B is about 6.5" and the distance A-C about 9.25".

The initially straight wire 9' as indicated in FIG. 6 in a like manner is a 40 mil diameter wire made of copper or aluminum. In this case, the distance A-D or overall length of the wire is 40", while the distances A-B and A-C are about 13" and 16", respectively. The reason for this greater length will be readily apparent when the electrical resistance characteristics of copper and aluminum are compared with those of carbon steel.

It will be understood, of course, that if a test probe insert were to be made of an undeformed, straight wire element, the length of the ultimate probe would be much too great for easy handling and use. To this end, therefore, the wire is deformed into the shape shown in FIG. 4. To accomplish this, the initially straight wire 9' is first threaded through a hollow tube or mandrel (not shown) approximately ⅜" in diameter. A portion of the wire is bent through an angle of about 180° at the point 35 located at one end of the mandrel, to define two reaches of wire 36 and 37. The former of these is then spiraled about the mandrel to form a plurality of turns 36a, approximately 6½ full turns being required for a 20" wire (FIG. 5) and approximately 16 full turns for a 40" wire (FIG. 6). When the so deformed wire is withdrawn from the mandrel, it will look essentially as shown at the to of FIG. 4. The straight end portion 36b of the section 36 of the wire and the still straight section 37 are then passed through the bores 27 and 28 of a "Teflon" plug 10' which is substantially identical with the plug 10 except that the bores in this case are much narrower than the bores shown in FIGS. 2a and 2b. A portion of the section 37 of the wire which is located beyond the plug end surface 23 is then spiraled about a smaller mandrel (not shown) about 5/32" in diameter, to form a plurality of turns 37a in this wire section, as shown in the bottom half of FIG. 4. The free ends of the wire member 9' may be bent or hooked slightly as shown at 36c and 37b to provide suitable anchoring points for the "black" and "red" wires 29 and 30 which, together with the leads 31, 32 and 33 are then soldered to the wire 9' at the positions indicated in FIGS. 5 and 6. When the so-formed probe insert 8', with the soldering points covered by suitable silicone rubber insulating tape (in lieu of the sleeves 34 shown in FIG. 2) is now fitted into a housing 11 and the "Teflon" plug 10' compressed by the nut 14, the probe will be rendered completely leak-proof, as explained hereinabove with respect to the probe shown in FIGS. 1 to 3.

If the wire testing member 9' is made of a high resistance metal such as "Inconel" or "Monel," it is found that it is not necessary to employ wires as long as those indicated schematically in FIGS. 5 and 6. In such cases, an 8" wire length is sufficient, and the spiraling of the reference element and the free leg of the sensing element may be dispensed with, since such spiraling is employed in any event only to shorten the overall length of the probe.

In lieu of the probe housing 11 being welded to a base member constituted by a flange or ring 17 to which a separate adapter element 18 is welded, it will be understood that the base member for the housing may be differently constructed. An example of such a different construction is shown in FIG. 7. The base member 38 in this case is a unitary piece of steel pipe machined externally to provide a body portion 39 and a relatively widerflange portion 40. The probe housing 11 is welded at one end to the flange portion 40, and the body portion 39 of the base member is internally threaded at its opposite end, as shown at 41, to accommodate the electrical connector or coupling 19.

It will further be understood that the principles of the present invention can be embodied in a multiple probe (not shown) which comprises a plurality of probes 6 each having a housing 11 and an individual probe insert 8 or 8′, all of the probe housings being welded to a common base member 17–18 or 38. A probe of the types herein described can also be mounted for axial movement in situ, as by means of a screw drive arrangement (not shown), to permit the sensing element of the probe to be disposed at different desired locations within any given corrosive environment. Moreover, where a probe according to the present invention is to be employed at very high temperatures or pressures, a possible accidental extruding of the "Teflon" sealing plug into the housing 11 may be prevented by providing a shoulder 45 (FIG. 2) on the interior surface of the housing bore or passageway 11a adjacent the inner end of the tapered surface 11 and abutting a small annular stainless steel back-up plate or disc 46, against the shoulder to provide support on the "Teflon" plug. The stainless steel back-up plate has holes to permit the tubing 9 to pass and "Teflon" sleeves 47 to insulate the tubing.

It is to be understood that the foregoing detailed description is given merely by way of illustration and that many variations may be made therein without departing from the spirit of my invention.

Having described my invention what I desire to secure by Letters Patent is:

1. A corrosion test probe adapted to be positioned in a corrosive environment, comprising an elongated tubular housing having a longitudianl passageway and open at least at one thereof, a fluorocarbon polymer sealing plug of substantially circular cross-section and having its outer peripheral surface tapered about 20° from a median region of maximum diameter to both ends, said passageway at said open end of said housing being tapered about 20° toward the outer surface of said housing, said housing being externally threaded at said open end thereof, said sealing plug being arranged in said housing at said open end thereof with one of the tapered portions of its outer peripheral surface engaging the tapered surface of said passageway, said sealing plug being provided with a pair of longitudinal bores, a unitary metallic testing member having a first section constituting a sensing element for exposure to said corrosive environment and a second section constituting a reference element to be protected from said corrosive environment, said first section having a pair of legs juxtaposed to one another, one of said legs being completely straight and the other of said legs being at least partly straight, straight portions of said legs extending through said bores, respectively, to a predetermined distance beyond the inner end surface of said sealing plug within said passageway thereby to dispose the major part of said first section exteriorly of said housing, said second section being an integral extension of said one leg of said first section and disposed entirely within said passageway, and a nut screwed onto said housing and provided with an inner contact surface tapered about 20° and engaging the other tapered portion of the outer peripheral surface of said sealing plug, whereby upon compression of the latter between said contact surface of said nut and said tapered surface of said passageway there is effected a thoroughly fluid-tight seal between said passageway in said housing and said corrosive environment both peripherally of said sealing plug and peripherally of said legs of said first section of said testing member.

2. A corrosion test probe according to claim 1, further comprising a plurality of electrical leads connected, respectively, to said testing member at the free end of said other leg of said first section, at the free end of said second section, and at the junction between said second section and said one leg of said first section, said leads being adapted for connection to a bridge-type measuring circuit so as to have said first and second sections of said testing member constitute two arms of said circuit.

3. A corrosion test probe according to claim 1, further comprising a plurality of sleeves of insulating material fitted over respective portions of said testing member at the points of connection of said leads thereto, to prevent any short-circuit contact between said points and said housing.

4. A corrosion test probe adapted to be positioned in a corrosive environment, comprising a tubular housing of solid thin gage stock having a longitudinal bore and open at one end thereof, a fluorocarbon polymer sealing plug mounted in said housing at said open end thereof and having its outer peripheral surface mated to the surface of said bore about said open end of said housing, said sealing plug being maintained in compressive stress to provide expansion of said plug transverse to said compressive stress and against the interior walls of said housing whereby to provide a fluid-tight seal peripherally of said plug between said bore and said corrosive environment, and a unitary testing member supported by said sealing plug and extending therethrough in a fluid-tight manner, said testing member having a first section constituting a sensing element located exteriorly of said housing for exposure to said corrosive environment, said first section of said testing member having a pair of legs juxtaposed to one another with one of said legs being completely straight and the other of said legs being straight from the free end thereof to an intermediate point and spiraled about said one leg from said intermediate point to the juncture of said legs, said one leg and the straight part of said other leg extending through said sealing plug to a predetermined distance beyond the inner end surface of the latter within said bore, and a second section constituting a reference element located completely within the confines of said bore and protected from said corrosive environment, said second section of said testing member being an integral extension of said one leg of said first section and being partly straight and partly deformed into a spiral.

References Cited in the file of this patent

UNITED STATES PATENTS

| | | |
|---|---|---|
| 965,684 | Bierce et al. | July 26, 1910 |
| 2,352,159 | Brodie | June 27, 1944 |
| 2,769,140 | Obenshain | Oct. 30, 1956 |
| 2,864,252 | Schaschl | Dec. 16, 1958 |
| 2,864,925 | Ellison | Dec. 16, 1958 |
| 2,869,003 | Marsh et al. | Jan. 13, 1959 |
| 2,982,930 | Wygant | May 2, 1961 |
| 2,993,366 | Birkness | July 25, 1961 |
| 3,085,426 | Freedman et al. | Apr. 16, 1963 |